Sept. 11, 1951 J. MASSINO 2,567,777
FISHING SIGNAL
Filed July 19, 1946 2 Sheets-Sheet 1
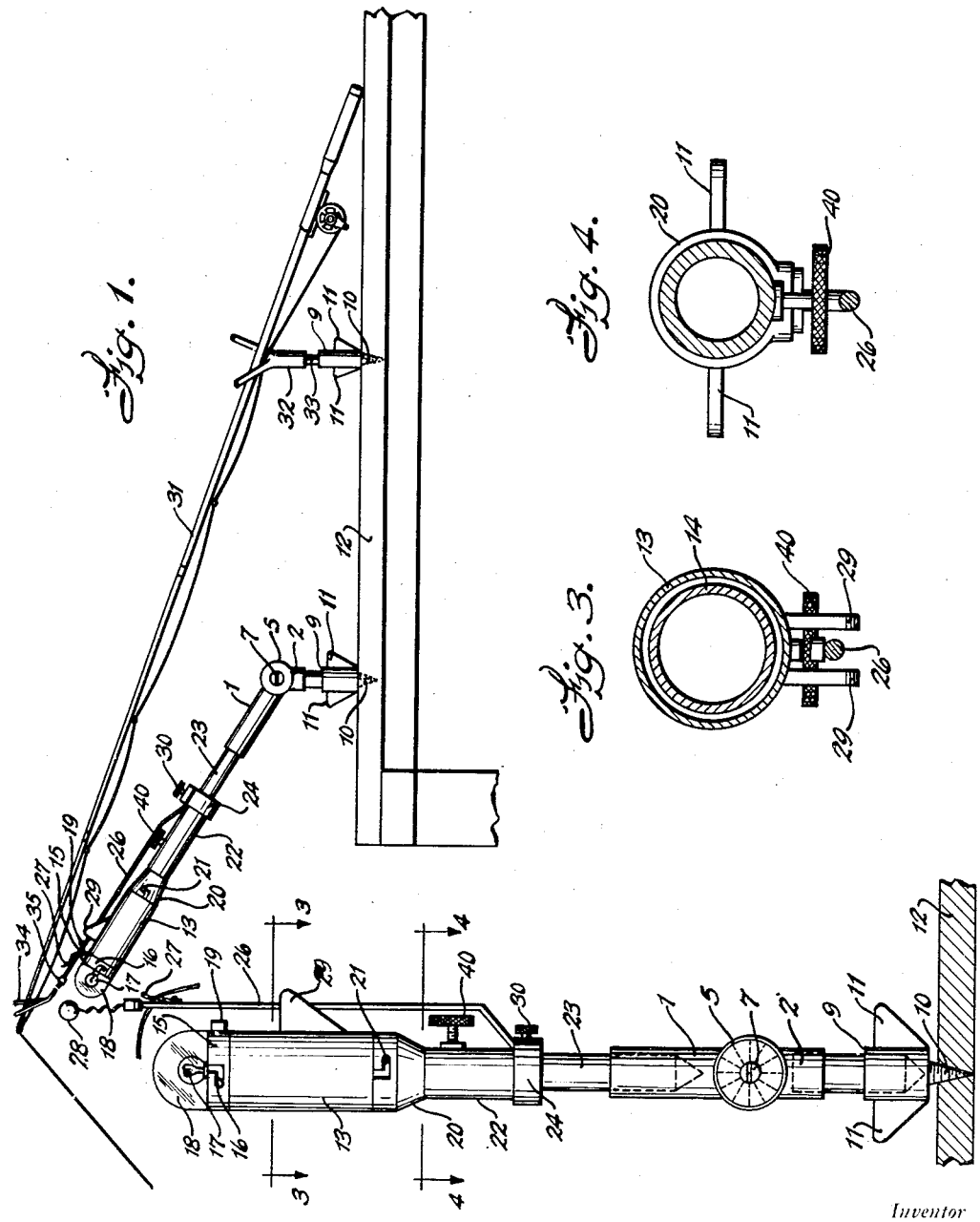
Inventor
Joseph Massino.
By Clarence A. O'Brien
and Harvey B. Jacobson
Attorneys Sept. 11, 1951  J. MASSINO  2,567,777
FISHING SIGNAL
Filed July 19, 1946  2 Sheets-Sheet 2
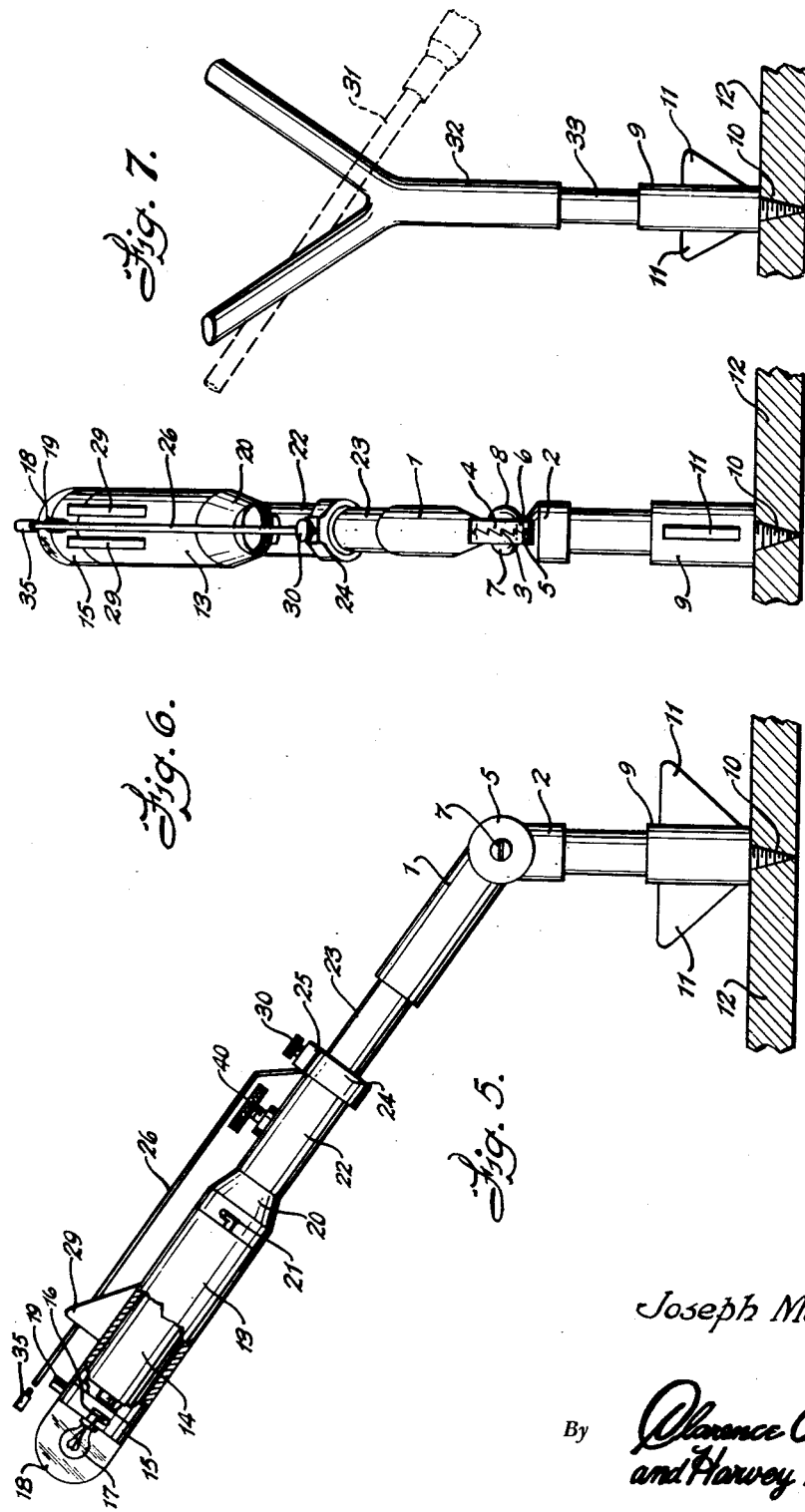
Inventor
Joseph Massino.
By Clarence A. O'Brien
and Harvey B. Jacobson
Attorneys Patented Sept. 11, 1951

2,567,777

UNITED STATES PATENT OFFICE 2,567,777

FISHING SIGNAL

Joseph Massino, Berwick, Pa.

Application July 19, 1946, Serial No. 684,926

1 Claim. (Cl. 43—17)

This invention relates to improvements in fishing signals to indicate to a fisherman when he has a nibble on his line.

An object of the invention is to provide an improved fishing signal which will be used in connection with means for supporting a fishing rod or line so that a person may be otherwise occupied while fishing, and when there is a nibble on his line, an audible or visual signal will be automatically operated, whereupon he may then pick up the rod or line and play the fish until it it landed.

Another object of the invention is to provide a signal means and a fishing pole or line supporting means which may be attached to any suitable support or inserted in the ground for supporting a fishing pole or line while the fisherman is otherwise occupied nearby, and said signal means being formed with a self-contained visual means and audible means which will be set in operation when there is a bite on the fishing line thus notifying the fisherman of this fact, who will then pick up the fishing rod and play the fish until it is landed or lost.

A further object of the invention is to provide an improved signal and line supporting arm together with an adjustable switch mechanism which will close said switch to operate the signal when a nibble or bite is had, thus making it unnecessary for the fisherman to constantly hold and watch his fishing pole or line.

Another object of the invention is to provide an improved fishing pole or line support and signal means therefor which will be highly efficient in operation, and relatively inexpensive to manufacture and produce.

Other objects will appear as the description proceeds.

In the accompanying drawings which form a part of this application,

Figure 1 is a side elevation of the improved fishing signal and the rod support in operative position with a fishing rod supported therein;

Figure 2 is a side elevation of the combined visual signal and line supporting means upon which an audible signal is mounted, showing the fishing line supported in the clip holder;

Figure 3 is a sectional view taken on the line 3—3 of Figure 2;

Figure 4 is a sectional view taken on the line 4—4 of Figure 2;

Figure 5 is a side elevation of the pivoted supporting ferrule device with a visual signal mechanism supported therein;

Figure 6 is a front elevation of the device shown in Figure 5, and

Figure 7 is a perspective view of a screw ferrule with fishing rod supporting ferrule, showing position of rod in dotted lines.

Like characters of reference are used throughout the following specification and the accompanying drawings to designate corresponding parts.

In carrying out the invention, there is provided an improved supporting device comprising the cooperating metal ferrules or socket members 1 and 2, which are compressed at their inner ends and formed with adjacent interengaging radial teeth 3 and 4 on the round bearing or clamping head 5 and 6, which are centrally apertured to receive the headed screw bolt 7 which is welded to the head 5 and extends through said apertures to be engaged by the rounded nut 8 for holding said ferrules and sockets 1 and 2 in the desired adjusted position.

The socket or ferrule 9 of a diameter to receive one of the ferrules or sockets 1 and 2 is formed with a screw 10 on its lower end, and with the oppositely disposed wings 11, whereby the same may be readily screwed into a board 12 of a pier or floor, or into any other desired wood support. It is intended that a pair of these attaching and supporting ferrules or sockets 9 will be provided for purposes hereinafter described.

The visual signal device includes a hollow body 13 of insulating material adapted to support one or more flashlight batteries 14. A ferrule 15 having a bayonet joint 16 will be detachably secured to the outer end of the body 13, and will support the socket and light bulb 17 and plastic transparent cover 18, and also a contact 19 electrically connected with the light bulb 17. A base ferrule 20 will be supported by the bayonet joint 21 to the inner end of the body 13 and will support the hollow ferrule 22 in which the wood pin 23 is received for positioning in the ferrule or socket 1 of the supporting device.

A band 24 forming a rectangular shaped socket 25 and locking screw 30 is secured on the lower end of the ferrule 22, and will support the short sectional metal switch operating arm 26 which will, in turn, support the line clip 27 and the audible signal bell 28, said arm 26 extending between the spaced guide arms 29 on the body 13, and is adjustable towards and away from the contact 19 by means of the screw 40 extending through the ferrule 22.

When a fishing rod 31 is to be used, a second screw supporting ferrule or socket 9 will be positioned adjacent its supporting ferrule or socket 9 upon which the signal device is supported, and the Y-crotch ferrule 32 in which the wooden dowel or peg 33 is positioned, is supported by the second socket 9 by inserting the lower end of the peg 33 in the said socket, as illustrated in Figures 1 and 7 of the drawings.

A Y-crotch 34 will be supported in the ferrule or socket 35 on the outer end of the sectional switch operating arm 26, and the fishing rod will be supported in said Y-crotches adjacent the opposite ends thereof, as illustrated in Figure 1 of the drawings, with the fishing line extending freely between the eyes on the rod.

From the foregoing description, it will be apparent that there has been provided a highly efficient form of fishing signal and rod supporting means which will be of a knock-down construction for ready transportation in a tackle box, said device being relatively inexpensive to manufacture and produce and foolproof and positive in operation at all times.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

A fishing signal comprising a casing having a battery therein and a light bulb, a contact operatively connected to said light bulb and extending laterally through said casing, a ferrule carried by said casing and adapted to receive a dowel pin for supporting said casing on a pier, a flexible elongated metallic switch arm extending longitudinally of said casing and overlying said contact, means adjustably clamping one end of said switch arm on said ferrule, a Y-crotch carried at the other end of said switch arm and adapted to guidingly receive and support a fishing pole, laterally extending spaced wings carried by said casing adjacent said contact and guidingly receiving said switch arm, and screw means carried by said ferrule for adjusting said switch arm towards and away from said contact.

JOSEPH MASSINO.

REFERENCES CITED

The following references are of record in the file of this patent:

UNITED STATES PATENTS

| Number | Name | Date |
|---|---|---|
| 87,188 | Monnier | Feb. 23, 1869 |
| 110,434 | Clarke | Dec. 27, 1870 |
| 448,028 | Hall | Mar. 10, 1891 |
| 977,835 | Piscator | Dec. 6, 1910 |
| 1,330,314 | Gott et al. | Feb. 10, 1920 |
| 1,737,921 | Derr | Dec. 3, 1929 |
| 2,126,457 | East | Aug. 9, 1938 |
| 2,184,583 | Danko | Dec. 26, 1939 |
| 2,341,065 | White | Feb. 8, 1944 |

FOREIGN PATENTS

| Number | Country | Date |
|---|---|---|
| 733,542 | France | July 11, 1932 |